(12) United States Patent
Zurbriggen

(10) Patent No.: US 6,759,068 B2
(45) Date of Patent: Jul. 6, 2004

(54) ONION AND GARLIC BIOHYDROLYSATES AND THEIR USE AS NATURAL FLAVORINGS

(75) Inventor: Beat Denis Zurbriggen, Buelach (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 10/122,068

(22) Filed: Apr. 15, 2002

(65) Prior Publication Data

US 2002/0155193 A1 Oct. 24, 2002

Related U.S. Application Data

(63) Continuation of application No. PCT/EP00/09513, filed on Sep. 28, 2000.

(30) Foreign Application Priority Data

Oct. 28, 1999 (EP) .............................. 99203557

(51) Int. Cl.[7] ................................ A23L 1/22
(52) U.S. Cl. ........................ 426/52; 426/49; 426/533; 426/534; 426/650
(58) Field of Search .................. 426/49, 52, 533, 426/534, 535, 536, 537, 538, 650, 656

(56) References Cited

U.S. PATENT DOCUMENTS 6,020,009 A * 2/2000 Wood et al. .................. 426/52

FOREIGN PATENT DOCUMENTS

| EP | 0818153 A1 * | 1/1998 |
|---|---|---|
| JP | 56018563 | 2/1981 |
| JP | 63214166 B | 9/1988 |
| JP | 2231056 A | 9/1990 |
| KR | 8800034 B | 2/1988 |
| WO | WO 98/18342 | 5/1988 |

* cited by examiner

Primary Examiner—Leslie Wong
(74) Attorney, Agent, or Firm—Winston & Strawn LLP

(57) ABSTRACT

The invention relates to a method for preparing an onion/garlic biohydrolysate-based flavoring base that includes mixing water with onion, garlic, or onion and garlic, hydrolyzing the mixture with one or more technical enzymes, and thermally treating the hydrolysate to provide a flavoring base. The invention further includes a method for production of a meaty flavor which includes providing a mixture of a crop protein source and a carbohydrate source, inoculating the mixture with at least one meat fermenting microorganism, fermenting the inoculated mixture until reaching steady state, adding a flavoring base to the fermented mixture to obtain a flavoring mixture, and pasteurizing the flavoring mixture.

15 Claims, No Drawings

ONION AND GARLIC BIOHYDROLYSATES AND THEIR USE AS NATURAL FLAVORINGS

CROSS-REFERENCE TO RELATED APPLICATION

This application is a continuation of application no. PCT/EP00/09513, filed Sep. 28, 2000, the content of which is expressly incorporated herein by reference thereto.

FIELD OF THE INVENTION

This invention relates to a method for preparing a flavoring base obtained by biohydrolysis of an onion/garlic mixture, or of individual onion or garlic powders and their use in flavor blends, in fermented mixtures, in process flavors, and in several culinary applications.

BACKGROUND OF THE INVENTION

In JP 59034869, fruits or vegetables are subjected to degradation and liquefaction with pectin transeliminase, which is derived from a culture solution of filamentous fungus such as *Aspergillus niger*. This process provides a flavored sauce.

JP 56018563 describes a process comprising crushing of onions and /or garlic, adding pectinases and/or cellulase and disintegrating it, and then spray-drying it.

JP 63214166 discloses a toasted and seasoned laver, which contains enzyme decomposed foods. In making the laver, foods such as ginger, garlic, orange, mushroom, onion, etc. are decomposed with a food-decomposing enzyme to obtain a paste, to which an edible high molecular compound (e.g., starch, gelatin) is added and coated or sprayed over a sheet of layer.

The patents mentioned above describe the possibility to develop flavored sauces by processing fruits or vegetables, fresh onion, and/or garlic by using mainly the endogenous enzymes.

SUMMARY OF THE INVENTION

The invention relates to a method for preparing an onion/garlic biohydrolysate-based flavoring base which includes mixing water with onion, garlic, or onion and garlic to form a mixture, hydrolyzing the mixture with one or more technical enzymes, and thermally treating the hydrolysate at a temperature and for a time sufficient for providing a flavoring base.

In one embodiment, the mixture includes 2% to 15% by weight of onion or garlic, or both onion and garlic, in a ratio of 1:6 to 6:1, with the balance being water. The onion or garlic may be either in solid or powder form, and the mixture is hydrolyzed at an acidic pH, preferably 4 to 7 for about 1 to 25 hours at a temperature of about 40° C. to 70° C. The thermal treatment is conducted at a temperature of about 75° C. to 125° C. for about 3 to 90 minutes. The technical enzymes are cellulolytic or proteolytic technical enzymes and are present in an amount of 0.1% to 2% by weight.

The technical enzymes include viscozyme, arabanase, cellulase, beta-glucanase, xylase, pectinase, or mixtures thereof. The method may further include heating the mixture for 3 to 60 minutes at a temperature of about 70° C. to 125° C. prior to hydrolyzing. The mixture may be hydrolyzed in a batch, continuous, or fed-batch mode. The invention also relates to the product made by such methods.

The invention also relates to a method for production of a meaty flavor which includes providing a mixture of a crop protein and a carbohydrate source, inoculating the mixture with at least one meat fermenting microorganism, fermenting the inoculated mixture until reaching steady state, adding the flavoring base to the fermented mixture to obtain a flavoring mixture to obtain a meaty flavor, and pasteurizing the flavoring mixture.

The microorganism may include *Pediococcus pentosaceus, Staphylococcus xylosus, Lactobacillus sake, Microccus varians, Debaryomyces hansenii, Saccharomyces cerevisiae,* or mixtures thereof. In various embodiments, the inoculated mixture is fermented for about 10 to 90 hours at about 15° C. to 50° C., and the flavoring mixture is pasteurized for 20 to 60 minutes at about 80° C. to 125° C. In another embodiment, the flavoring base is added as a feed during the fermentation step. The invention also relates to a flavoring mixture that has a meaty flavor.

DETAILED DESCRIPTION OF THE INVENTION

This invention provides an onion and garlic biohydrolysate-based flavoring base with a unique flavor profile, the flavoring base being obtained by a controlled hydrolysis of onion or garlic or mixtures of both ingredients by the addition of technical enzymes. A well-equilibrated ratio of onion and garlic is elaborated to provide optimal medium design for further bio-hydrolysis. The flavoring base according to the invention is obtained by:

1) preparing a mixture containing at least 2% to 15% of onion or garlic or of a mixture of onion and garlic in a ratio of 1:6 to 6:1, and up to about 94% of water.
2) hydrolyzing the mixture with cellulolytic and proteolytic technical enzymes; and
3) thermally treating the hydrolysate at a temperature of about 75–125° C. during about 3 to 90 minutes so as to obtain the flavoring base.

The flavoring base may be filtered, dried, evaporated, or directly stored at +4° C. or −25° C.

In another aspect, the invention also relates to the use of an onion and garlic biohydrolysate-based flavoring base as a source of meaty and roasty, unique onion and/or garlic notes in flavor blends. The invention may also be used in other processes for the preparation of flavorings used in culinary product development, for the development of liquid seasonings, for bouillon development, for petfood products, in sauces, in spreads or snack applications.

The biohydrolyzed materials can also be utilized in several culinary applications to improve the onion and/or garlic note or to intensify the meaty notes of the products, such as fermented plant material. The products obtained thereof have a rounder flavoring with typical and clean onion and garlic notes.

In the specification, all percentages are given on the basis of weight except where specifically stated otherwise. Also, the term "flavor" comprises odor, aroma, or taste. The term "technical enzyme" as used herein, refers to an enzyme that is not normally naturally occurring, but is rather commercially available.

In order to obtain the flavoring base according to the present invention, a mixture containing at least 2% to 15% of onion, garlic, or a mixture of onion and garlic in a ratio of 1:6 to 6:1, is prepared. Onion and garlic can be used directly as raw material or preferably in the form or a powder.

The mixture can also be heat treated from about 10 to 30 minutes at a temperature of about 70° C. to 125° C., then cooled to a temperature of 30° C. to 70° C. (preferably 50° C.) before adding the technical enzymes, in order to have a low microbial count when starting the bio-hydrolysis.

This mixture is then subjected to a hydrolytic treatment with individual proteolytic or cellulolytic technical enzymes, or preferably with a mixture of these technical enzymes. Cellulolytic technical enzymes such as Viscozyme can be used to perform the hydrolysis. A mixture of hemicellulase, carbohydrases, including arabanase, cellulase, beta-glucanase, xylase, and pectinase, and other side-activities are preferably added to the mixture at a rate of about 0.1% to 2% (or up to 4% to 6% in a cascade hydrolysis). The hydrolysis may be performed in a batch, continuous, or fed-batch (feeding strategy) modus (cascade biohydrolysis).

The hydrolysis is preferably performed at an acidic pH of 4 to 7, for about 1 to 30 hours at a temperature of about 40° C. to 70° C. The mixture can be stirred during the hydrolysis at, for example, up to 1000 rpm, and preferably at 170 to 190 rpm, for bio-hydrolysis in a 2 Liter glass reactor. The media for biohydrolysate can be used either without a thermal processing step, or, by applying a sterilization step, and is cooled to 50° C. before the technical enzymes are added.

The obtained biohydrolysate is further subjected to thermal treatment. The thermal treatment is performed at about 75° C. to 125° C. for about 15 to 90 minutes, in order to obtain the flavoring base. It is preferably performed at about 90° C. for about 60 minutes.

The flavoring base may then be stored at +4° C. or –25° C., eventually filtered, concentrated by evaporation or dried. The base is preferably dried by adding maltodextrin, salt, palm fat or mixtures thereof, and then heated at 65° C. for 6 to 7 hours under vacuum (10 mbar). The base may also be spray-dried.

The water content of the flavoring base in its powder form may be about 4% to 6%, and the dry matter content of the mixture may be about 94% to 96%.

The flavoring base can also be filtered after the thermal treatment. The unique flavoring is present in the filtered liquid fraction, which may be submitted to further downstream processing and then used in culinary applications. The sediment obtained during the filtration processing may be used in bouillon applications in order to lower the costs and to find possibilities to up-grade the obtained press-cake during the filtration step.

In another embodiment, the flavoring base according to the present invention is utilized in flavor blends, in fermented mixtures, in process flavors, and in several culinary applications to enhance or impart typical, unique, specific, and authentic flavor.

In a preferred embodiment, the flavoring base can be added to fermented mixtures (fermentation broth), so as to obtain a meaty flavored product, or, included in bouillons after filtration processed flavors, sauces, or paste preparation processes.

Thus, a process for production of meaty flavors comprises the steps of:
  providing a mixture of crop protein source and carbohydrate source (having a dry matter of at most 45%),
  inoculating the mixture with at least one meat fermenting micro-organism,
  fermenting the mixture until it reaches steady state,
  adding the flavoring base according to the invention to the fermentation medium by means of fed-batch mode, and
  pasteurizing the obtained mixture.

The mixture of crop protein source and carbohydrate source may preferably have a dry matter content of at most about 45% in order to effect the fermentation as a liquid-state.

For the fermentation step, several meat fermenting microorganisms such as *Pediococcus pen tosaceus, Staphylococcus xylosus, Lactobacillus sake, Microccus varians, Debaryomyces hansenii,* or *Saccharomyces cerevisiae* may be used as individuals strains or as mixtures.

The fermentation may be carried out for a period of time of about 10 to 90 hours at a temperature of about 15° C. to 50° C. under agitation from 150 to 1500 rpm, until reaching steady state.

The addition of the flavoring base according to the invention may be achieved at the end of the fermentation as fed-batch mode, that is, a progressive addition of the flavoring base to the fermentation medium. Thus, the medium can be pasteurized by conventional means, such as 20 to 60 minutes at about 80° C. to 125° C.

The meaty flavored product may be concentrated and/or dried afterwards, and be used directly in its liquid or dried form.

The amount of the liquid form is preferably about 60 grams per kg of fermented product or 10 to 100 grams for culinary product or petfood product, depending on the requisite degree of aroma.

The dried form of the flavoring base may be used in an amount of 4 to 10 grams per kg.

The ratio of 15% to 85% of garlic to onion resulted in a more rounded and typical garlic flavoring, which is equilibrated due to the addition of a small part of garlic. Depending on the ratio used, the type of the flavoring can be influenced, depending on if a pure onion or pure garlic flavoring is desired.

The mixtures have a synergistic effect and some meaty and/or roasted notes could be generated during the biohydrolysis and in combination with the thermal processing. It can be assumed that sulfur precursors, intermediates, or thiol components are liberated or synthesized during processing. These thiols might be important also for the generation of meaty notes, especially in combination with fermented products.

The invention also relates to the use of the flavoring base in various flavor blends, and process flavors, and in combination with fermented meaty products, where the onion/garlic biohydrolysate can be added as a feed during the fermentation process. Thus, it can add meaty notes and roasty notes to these fermented bases.

The flavoring base may be also used for process flavor development, for the development of liquid seasonings, for bouillon development after filtration of processed flavors, for petfood products, in sauces, in spreads, or in snack applications.

EXAMPLES

The following examples are given by way of illustration only and in no way should be construed as limiting the subject matter of the present application.

Example 1

86.6% water is added to a mixture containing 6.7% onion and 6.7% garlic in the powdery form. The mixture thus obtained is hydrolyzed by the addition of about 0.2% Viscozyme (commercially available from NOVO NORDISK FERMENT Ltd.) at pH 5 for about 20 hours and at a temperature of about 50° C. The biohydrolysate is then heat treated at 90° C. for 60 minutes in order to obtain the flavoring base which is stored at –25° C. It is further utilized in the preparation of pastes, process flavors, sauces, spreads, bouillons, or fermented bases.

Example 2

93.3% of water is added to a mixture containing 6.7% of onion in powdery form. The mixture thus obtained is hydrolyzed by the addition of about 0.20% of Viscozyme (NOVO NORDISK FERMENT Ltd.) at pH 5 for about 20 hours and at a temperature of about 50° C. The biohydrolysate is then heat treated at 90° C. for 60 minutes in order to obtain the flavoring base which is stored at –25° C. It is further utilized in the preparation of pastes, process flavors, sauces, spreads, bouillons or fermented bases.

Example 3

93.3% of water is added to a mixture containing 6.7% of garlic in its powdery form. The mixture thus obtained is hydrolyzed by the addition of about 0.2% of Viscozyme (NOVO NORDISK FERMENT Ltd.) at pH 5 for about 20 hours and at a temperature of about 50° C. The biohydrolysate is then heat treated at 90° C. for 60 minutes in order to obtain the flavoring base which is stored at −25° C. It is further utilized in the preparation of pastes, process flavors, sauces, spreads, bouillons, or fermented bases.

Example 4

13% of onion powder and 13% of garlic powder is added to 74% of water. The mixture is sterilized during 15 minutes at 121° C. A mixture of about 0.4% w/w of Viscozyme (NOVO NORDISK FERMENT Ltd.) is added to the treated mixture, and stirred for about 20 hours at pH 5.0 at 50° C.

The mixture is then subjected to a thermal treatment for 30 minutes at about 90° C. and the filtered liquid fraction is then evaporated and dried, either by spraydrying, vacuum drying, or used without drying.

Taste Test

In order to conduct a taste test, ingredients and bases are weighed in a 250 ml cup. The base used is a seasoning pork base, which contains enhancers, salt, spices, fats, and extracts. The ingredients to be tested are onion powder, onion biohydrolysate, roasted onion powder, garlic-powder, garlic bio-hydrolysate, and garlic-onion biohydrolysate.

Boiled water is added to the cup, and left until the temperature has reached about 65° C. and then the product is taste tested. The results are given in table 1.

TABLE 1

Taste testing base for onion or garlic flavored culinary applications

| Ingredients | Amount (g/250 ml) | Score (1–5)* | Remarks |
|---|---|---|---|
| Base | 3.40 | Ref. | No onion flavor |
| NaCl | 0.15 | | Good as a base for blending |
| Base | 3.40 | 2 | Onion taste and smell |
| NaCl | 0.15 | | |
| Onion powder | 1.25 | | |
| Base | 3.40 | 2 | Garlic taste and smell, no |
| NaCl | 0.15 | | rounded, not clean |
| Garlic-powder | 1.25 | | |
| Base | 3.40 | 3 | Roasted onion taste |
| NaCl | 0.15 | | |
| Roasted onion powder | 1.25 | | |
| Base | 3.40 | 5 | More pronounced and rounded |
| NaCl | 0.15 | | onion taste and smell |
| Onion Bio-hydrolysate | 1.25 | | |
| Base | 3.40 | 4 | More pronounced and rounded |
| NaCl | 0.15 | | onion taste and smell; clean |
| Garlic Bio-hydrolysate | 0.25 | | flavor |
| Base | 3.40 | 5 | Best sample, garlic flavoring, |
| NaCl | 0.15 | | rounded flavor, clean notes |
| Garlic-Onion biohydrolysate | 0.25–1.25 | | |

*Quality of onion or garlic taste and smell; 5 best score, 1 bad score

Comparative Example

A fermentation process is developed in combination with the addition of the bio-hydrolyzed onion/garlic mixture at the end of the fermentation.

The fermented meaty flavorings may be prepared according to the following steps:

a) prehydrolysis of a onion and garlic mixture,
b) fermentation, wherein:

medium design comprises Glucose (2%), prehydrolyzed plant proteins (10%); sunflower oil (1.5%), white pepper (0.3%/) and water (86%)

sterilization (30 min, 90° C.), inoculation of the bioreactor. Several meat fermenting micro-organism such as *Pediococcus pentosaceus, Staphylococcus xylosus, Lactobacillus sake, Micrococcus varians, Debaryomyces hansenii* or *Saccharomyces cerevisiae* can be used as individual strains or as mixtures. The fermentation conditions are preferably 20 to 72 hours, at a temperature of about 20 to 45° C., at a pH either controlled by pH-state or non-controlled; aeration (0-2.0 Vvm: L air per working volume per H), agitation: 500-1300 rpm (800 rpm).

inactivation during 20 to 60 min at about 80° C. to 125° C., and preferably for 30 min at 90° C.

downstream processing, such as evaporation and then vacuum drying (10 mbar, 6–7 H, 65° C.), or spray drying of the pasteurised fermented broth The dried base can be utilized in process flavors or in culinary products.

Example 6

A composition containing 5 g/L of the flavoring base as prepared in Example 1, 13.6 g/L of a seasoning base and 0.6 g/L of salt, is used in flavor blends. It has a rounder flavoring, typical and clean onion and garlic notes are present.

Example 7

A seasoning for spread type garlic applications is prepared by mixing the following ingredients given in table 2:

TABLE 2 ingredients for a seasoning for spread type garlic

| Ingredients | Quantity (%) |
|---|---|
| Hydrolyzed roasted garlic powder prepared as in Example 3 | 2.5 |
| Hydrolyzed garlic powder prepared as in Example 3 | 15.0 |
| Light roasted onion powder | 3.0 |
| Maltodextrin | 49.5 |
| Hydrolyzed onion-garlic powder as prepared in Example 1 | 15.0 |
| Savory flavors | 13.0 |
| White pepper | 2.0 |

The mixture is sieved and 12.5% is then mixed into margarine. 0.3% salt is added to the aromatized margarine. The seasoning base has a garlic taste and is used for appetizers, breads, sandwiches, or canapès.

Example 8

A seasoning for spread type pesto applications is prepared by mixing the ingredients as given in Table 3:

TABLE 3 ingredients for a seasoning for spread type pesto

| Ingredients | Quantity (%) |
|---|---|
| Cheese flavors | 5.0 |
| Cheese powder | 17.0 |
| Maltodextrin | 39.0 |
| Hydrolyzed onion-garlic powder as prepared in Example 1 | 13.0 |

TABLE 3-continued ingredients for a seasoning for spread type pesto

| Ingredients | Quantity (%) |
|---|---|
| Savory flavors | 20.0 |
| Compound Flavors | 6.0 |

The mixture is sieved and 12.5% is mixed into margarine. It has a pesto and garlic taste and is used for appetizers, breads sandwiches, or canapès, for example.

Example 9

A seasoning for a traditional soup is prepared having the composition given in table 4:

TABLE 4 ingredients for a traditional soup

| | Ingredients | Quantity (%) |
|---|---|---|
| Dry mix | Salt | 5.0 |
| | Mono sodium glutamate | 2.0 |
| | sugar | 1.8 |
| | Hydrolyzed garlic powder as prepared in Example 3 | 0.5 |
| | Hydrolyzed onion powder as prepared in Example 2 | 1.2 |
| | BHP powder | 0.6 |
| | Skim milk powder | 6.0 |
| | Corn starch | 1.5 |
| | wheat flour | 6.0 |
| | Spice mixture | 1.3 |
| | fat (bacon/beef) | 5.6 |
| | fat flakes | 1.8 |
| | barley flakes | 46.5 |
| | leek | 1.0 |
| | potato flakes | 1.4 |
| Potato flakes | | 6.5 |
| Beans | | 11.3 |

60 to 80 grams of this powder is mixed in 1000 mL of water so as to obtain a traditional soup with an onion/garlic/barley taste.

What is claimed is:

1. A method for production of a meaty flavor composition which comprises:
   providing a mixture of a crop protein source and a carbohydrate source,
   inoculating the mixture with at least one meat fermenting microorganism;
   fermenting the inoculated mixture until reaching steady state;
   adding a flavoring base to the fermented mixture to obtain a flavoring mixture having a meaty flavor, the flavoring base formed by hydrolyzing onion, garlic, or a mixture thereof with one or more technical enzymes and thermally treating the hydrolysate; and
   pasteurizing the thermally treated flavoring mixture to obtain the meaty flavor composition.

2. The method of claim 1, wherein the mixture has a dry matter content of up to about 45%.

3. The method of claim 1, wherein the microorganism comprises *Pediococcus pentosaceus, Staphylococcus xylosus, Lactobacillus sake, Microccus varians, Debaryomyces hansenii, Saccharomyces cerevisiae,* or mixtures thereof.

4. The method of claim 1, wherein the inoculated mixture is fermented for about 10 to 90 hours at about 15° C. to 50° C.

5. The method of claim 1, wherein the flavoring mixture is pasteurized for 20 to 60 minutes at about 80° C. to 125° C.

6. The method of claim 1, wherein the flavoring base is added as a feed during the fermentation step.

7. A flavoring mixture that has a meaty flavor and is prepared by the method of claim 1.

8. The method of claim 1, wherein the onion and garlic mixture includes 2% to 15% by weight of onion or garlic, or both onion and garlic in a ratio of 1:6 to 6:1, with the balance being water.

9. The method of claim 1, wherein the onion or garlic are in either solid or powder form, and the mixture is hydrolyzed at an acidic pH for about 1 to 25 hours at a temperature of about 40° C. to 70° C.

10. The method of claim 9, wherein the mixture is hydrolyzed at a pH of 4 to 7 and the thermal treatment is conducted at a temperature of about 75° C. to 125° C. for about 3 to 90 minutes.

11. The method of claim 1, wherein the technical enzymes are cellulolytic or proteolytic technical enzymes and are present in an amount of 0.1% to 2% by weight.

12. The method of claim 1, wherein the technical enzymes comprise viscozyme, arabanase, cellulase, beta-glucanase, xylase, pectinase, or mixtures thereof.

13. The method of claim 1, wherein the flavoring base is heated for 3 to 60 minutes at a temperature of about 70° C. to 125° C. prior to hydrolyzing.

14. The method of claim 1, wherein the mixture is hydrolyzed in a batch, continuous, or fed-batch mode.

15. A method for production of a meaty flavor composition without the use of meat which comprises:
   providing a mixture of a crop protein source and a carbohydrate source;
   inoculating the mixture with at least one meat fermenting microorganism;
   fermenting the inoculated mixture until reaching steady state;
   adding a flavoring base to the fermented mixture to obtain a flavoring mixture having a meaty flavor, the flavoring base formed by hydrolyzing onion, garlic, or a mixture thereof with one or more technical enzymes and thermally treating the hydrolysate; and
   pasteurizing the thermally treated flavoring mixture to obtain the meaty flavor composition.

* * * * *

UNITED STATES PATENT AND TRADEMARK OFFICE
CERTIFICATE OF CORRECTION

PATENT NO. : 6,759,068 B2
DATED : July 6, 2004
INVENTOR(S) : Zurbriggen

It is certified that error appears in the above-identified patent and that said Letters Patent is hereby corrected as shown below:

Column 5,
Line 14, after "and stirred for about 20 hours at pH 5.0 at" insert -- about --.

Column 7,
Line 12, change "breads sandwiches," to -- breads, sandwiches --.

Signed and Sealed this

Twenty-first Day of December, 2004

JON W. DUDAS
*Director of the United States Patent and Trademark Office*